United States Patent [19]
Lagace et al.

[11] Patent Number: 5,856,415
[45] Date of Patent: Jan. 5, 1999

[54] OPTICALLY TRANSPARENT METAL-CONTAINING POLYMERS

[75] Inventors: Arthur Lagace, Newtonville, Mass.; Ray C. Lapof, New York, N.Y.

[73] Assignee: Bar-Ray Products, Inc., Littlestown, Pa.

[21] Appl. No.: 919,725

[22] Filed: Aug. 28, 1997

[51] Int. Cl.⁶ ........................................ C08F 4/06
[52] U.S. Cl. ..................... 526/192; 526/240; 524/399; 524/409; 524/413; 524/424; 528/92; 525/408; 525/454; 525/506; 525/533; 525/535
[58] Field of Search .................... 526/192, 240; 524/399, 409, 413, 424; 528/92; 525/408, 454, 506, 533, 535

[56] References Cited

U.S. PATENT DOCUMENTS

| | | | |
|---|---|---|---|
| 4,129,524 | 12/1978 | Nagai et al. | 526/192 |
| 4,182,821 | 1/1980 | Nagai et al. | 526/240 |
| 4,412,064 | 10/1983 | Hinman | 526/9 |
| 4,429,094 | 1/1984 | Massucco | 526/240 |
| 4,464,525 | 8/1984 | Vance | 528/9 |
| 4,585,841 | 4/1986 | Eguchi et al. | 526/240 |
| 5,100,762 | 3/1992 | Tanaka et al. | 526/240 |
| 5,113,477 | 5/1992 | Eguchi et al. | 526/240 |
| 5,212,261 | 5/1993 | Stierman | 528/361 |

FOREIGN PATENT DOCUMENTS 6-322136  11/1994  Japan.

*Primary Examiner*—Randy Gulakowski
*Attorney, Agent, or Firm*—Barry G. Magidoff

[57] ABSTRACT

A method for producing a metal-containing transparent polymer by the reaction of a metal carboxylate, with a clear setting resin system comprising a thermosetting resin and a curing agent. The reaction occurs in a temperature in the range of from about 0° to about 100° C. under conditions which prevent air from being entrapped in the mixture, either during mixing of the reagents or during reaction. The metal carboxylate contains from about 20 to about 60 weight percent of metal. The reagents react for a time sufficient to form a transparent polymer. The resins include preferably epoxies, polyesters, polyurethane, polyisocyanurate, polyether sulfones, polyimides, and mixtures of two or more of these thermoset polymers. The final metal-containing transparent polymer preferably contains at least 15% by weight of the metal. Preferred metals include antimony, barium, bismuth, cadmium, cerium, cobalt, copper, iron, lead, molybdenum, tungsten, ranadium, and zirconium.

17 Claims, No Drawings

OPTICALLY TRANSPARENT METAL-CONTAINING POLYMERS

The present invention is directed to organometallic-containing polymers. More specifically it relates to optically transparent heavy metal-containing polymeric material that can provide radiation shielding.

Optically transparent polymers containing a level of a metal date back to at least World War II. At that time acrylic canopies were employed in military aircraft. However when such canopies were fractured it was difficult to find the clear plastic when it penetrated crew members. Subsequently, it was found that adding small quantities of certain metallic compounds, for example leaded compounds such as leaded organics to the acrylics would result in any embedded material showing up as an opaque shadow on an X-ray. However, these initial acrylic plastics had a low metal level. Various attempts were made to try to increase the metal content of the polymers, without unduly reducing other desirable properties, in order to increase the range of its usefulness, e.g., increasing the proportion of lead in a polymer, improve the effectiveness as a radiation barrier, while maintaining the optical transparency of the polymer. Efforts have included adding radiopaque materials to polymeric powders and/or to monomeric liquids in simple admixture or in polymerization processes. However, previously. such methods have generally unduly degraded the other desirable physical properties of the resulting product. Additionally many of the radiopaque materials leach from the polymer substrate.

U.S. Pat. No. 4,129,524 describes a radiation shielding material formed from a polymer comprising at least one essential monomer selected from the group consisting of alkyl methacrylate having 1–4 carbon atoms in the alkyl group, hydroxyalkyl acrylate, hydroxyalkyl methacrylate styrene, and lead acrylate or lead methacrylate and a lead carboxylate in specified ratios.

U.S. Pat. No. 4,182,821 describes a method for producing a lead containing monomer that involves acrylates and lead oxides.

U.S. Pat. No. 4,429,094 discusses optically transparent organometallic polymers prepared from polyvalent metal salts containing monomers of specified formulas.

U.S. Pat. No. 4,585,841 is directed to organometallic containing polymers which can be used as lenses.

Typically prior processes require a number of components. Moreover, up until now, high metal content has not been successfully achieved together with other desired properties. In addition, it would be desirable to provide a method involving fewer components, while obtaining a high metal content and maintaining transparency.

SUMMARY OF THE INVENTION

The method of this invention provides an optically transparent polymer formed by the combination of an organometallic compound, preferably a metallic carboxylate, and a clear setting resin in which the metal carboxylate is fully dispersible. Generally, the metal carboxylate has the formula $M((COO)_bRe)_a$, wherein M is a metal atom having an atomic number of at least about 40, R is an organic group selected from aliphatic, cycloaliphatic and aromatic groups containing at least about 3 carbon atoms, b equals the number of carboxyl groups attached to each R group, and a equals the number of organic carboxyl groups $(R(COO)_b)$ attached to each metal (M) atom, and wherein neither the metal nor the R group interferes with the curing of the polymer. Commonly available examples of the metal carboxylate, which are known as metallic soaps, have the formula: $M(RCOO)_a$, wherein M is a metal preferably having an atomic number of at least about 40, and preferably capable of existing in two or more valence states, i.e., the valence state of the compound, e.g., 1 or 2, and a higher state, e.g., 3 or 4. Preferably, M is selected from the group consisting of aluminum, antimony, barium, bismuth, cadmium, cerium, cobalt, copper, iron, lead, magnesium, manganese, molybdenum, nickel, strontium, tungsten, mercury, uranium, zinc, and zirconium. More preferably, M is barium, cadmium, mercury, calcium, lead, strontium and zinc. Still more preferably, M is lead. R is a saturated or unsaturated hydrocarbon, and "a" is an integer equal to the valence of the metal ion used. The metal carboxylate is reacted with liquid, thermo-setting resins, which upon cure are transparent, where the metal carboxylate has an initial dispersibility at the reaction temperature. Preferably, the metal carboxylate does not significantly adversely affect the curing of the resin monomers, i.e., prevent crosslinking of the resin.

Mixed monocarboxylate-dicarboxylate salts can also be used, within the scope of this invention, having formulas such as $(R'COO)_b MOOCRCOOM(R''COO)_b$, wherein R, R' and R'' can be the same or different and are generally defined as "R" above; and "b" is equal to one less than the valence of the metal. This type of compound will result in an increased proportion of the metal in the final optically transparent polymers, because of the higher proportion of metal in the compound.

Preferably, the metal carboxylate, e.g., lead carboxylate, is dissolved in the liquid and thermosetting resins in a ratio of about 15 to about 45 weight percent, measured as the metal, based on the combined mixture; still more preferably about 35 to about 45 weight percent of the combined mixture; still more preferably about 38 to about 43 weight percent. It is desired that a metal carboxylate having a metal weight content of at least about 35% is used so that the resultant formed polymer has a metal equivalency of at least about 1 mm of lead, more preferably at least about 1.25 mm of lead, still more preferably at least about 1.5 mm of the corresponding bulk metal per 1 inch thickness of the metal-loaded polymer.

The liquid, thermosetting resin is preferably an epoxy, such as a bisphenol A/epichlorohydrin resin, cycloaliphatic epoxy, novalic based epoxy, epoxy varnishes made with esters of epoxy resins and epoxy-aminoplastic resins; other useful liquid and thermosetting resins include allylic resins, polyester, polyurethanes and silicones. More preferably the monomer is selected from the group of epoxy systems, allylic resins, and polyesters. Even more preferably it is an epoxy system, such as the epichlorohydrin-bisphenol A epoxies.

The liquid, thermosetting resin and metal carboxylate are blended under conditions to minimize entrapment of gas within the liquid blend. For example, under vacuum in a pressure vessel reactor. Preferably, a so-called "static mixer" is used to properly blend the resins and metal carboxylate in the pressure vessel reactor. Typically it is mixed at about 20° to 70° C., more preferably about 30° to 40° C. An elevated temperature is often required to reduce the viscosity of the metal carboxylate, to ease mixing and reduce gas entrapment, as well as to accelerate any reaction that may occur.

The final curing reaction of the epoxy is highly exothermic, potentially raising the temperature to about 300° C. Thus, care is used to chill the vessel that the mixture is in to avoid overheating, while preventing solid formation in the mixture. After the resin and metal carboxylate are fully mixed, curing is commenced. When curing requires the addition of another component, the same mixing process can be continued to fully disperse the curing component.

Viscosity depressants and diluents to aid processing can be used.

The resultant polymer can be formed in the desired shape by standard means used for thermosetting resins. For example, it can be mold set, depending upon the final use.

DETAILED DESCRIPTION OF THE INVENTION

We have discovered novel heavy metal-loaded, optically transparent polymers that are formed by reaction between an organometallic compound, preferably a metallic carboxylate, and a liquid and thermosetting resin, in which the organometallic compound is soluble, or fully dispersible.

Preferably the metal carboxylate has the formula: $M(RCOO)_a$, wherein M is metal preferably having an atomic number of at least about 40 and preferably of at least 45. Mixtures of metals can be used. Preferably, M is selected from the group consisting of antimony, barium, bismuth, cadmium, tin, thallium, cerium, lead, molybdenum, tungsten, vanadium, mercury, gadolinium, and zirconium. More preferably, M is lead, cadmium, barium, tin and gadolinium. Still more preferably, M is lead.

In the formula, "a" is an integer equal to the valence of the metal used. It is preferably between 2 and 4. More preferably, the metal is one which exists in the compounds at a valence of 1 or 2, but can also exist at a higher valence state. R is a saturated or unsaturated hydrocarbon residue, which can be unsubstituted or substituted, for example with a hydroxyl group, bromine or iodine. The hydrocarbon can have from about 3 to 20 carbon atoms, preferably, 5–18 carbon atoms. As the carbon number decreases below or increases above the range set forth, the optical transparency and/or mechanical properties of the resulting composition are less than optimum and can hinder the complete attainment of the objects of the present invention. Typical examples of useful metal carboxylates include the hexanoate, heptanoate, octanoate (2-ethylhexanoate), nonanoate, decanoate, laureate, myristate, palmitate, stearate, arachidate, 2-hexenoate, 9-decenoate, linderate, laureate, myristolate, palmitoleate, petroselinate, oleate, elaidate, linoleate, linolenate, sorbate, geranate, salicylate, versalate, ricinoleate, ricinelaidate, naphthenate, octylbenzoate and the like. Useful dicarboxylic acids include glutaric, adipic, pimelic, phthallic, azelaic, sebacic, suberic, and higher acids, such as dodecanedioic acid. Mixtures of such mono and di-carboxlic groups can be used.

As aforesaid, a preferred metal carboxylate is a lead carboxylate. Examples of such lead carboxylates are lead hexanoate, lead heptanoate, lead octoate (octanoate), lead nonanoate, lead decanoate, lead laureate, lead myristate, lead palmitate, lead stearate, lead arachidate, lead 2-hexenoate, lead 9-decenoate, lead linderate, lead lauroleate, lead myristoleate, lead palmitoleate, lead petroselinate, lead oleate, lead elaidate, lead linoleate, lead linolenate, lead sorbate, lead geranate, lead salicylate, lead versalate, lead ricinoleate, lead ricinelaidate, lead naphthenate, lead octylbenzoate and the like.

Preferred lead carboxylates include lead octoate, lead napthenate, lead linolenate, lead oleate, lead decanoate, lead myristate, lead stearate, lead myristoleate, lead dexanoate, lead ricinoleate, lead salicylate and lead versalate. Aliphatic carboxylates are typically preferred over cyclic structures, whether cycloaliphatic carboxylates or aromatic carboxylates.

A lead octoate (lead 2-ethylhexanoate) is presently preferred with epoxy resins because of clarity, viscosity, cost and compatibility.

It is also preferred that the metal have multiple possible valence states, and furthermore, the compound selected have the metal in its lower valence state. For example, plumbous octoate, stannous heptonate, thallous hexanoate, are compounds in which the metal is in a lower valence state, i.e., 2 or 1, and where the metal also can exist in a higher valence state, i.e., 4 or 3. There is evidence that these additional available valence states play a role in the dispersibility of the carboxylate and the ultimate clarity of the metal-loaded cured polymer.

The preferred metal carboxylates have the highest possible percent of metal, but also must be readily dispersible in, and not interfere with the curing reaction of, the liquid, thermosetting resin. There appears to be some tension between these two features. To achieve the highest percent of metal, the carboxylate group should be as small as possible, e.g., an acetate or a formate. However, it has also been found that the lower molecular weight carboxylate groups are not as readily dispersed in, or interfere with the curing of, the thermosetting polymer. It is for this reason that the preferred carboxylates have at least three (3), and more preferably, at least five (5), carbon atoms.

The final optically transparent polymer product preferably has a metal loading of from about 15 to about 40 weight percent of metal in the cured final product. The proportion of metal in the metal carboxylate is typically in the range of from about 25 to about 60 weight percent. For example one preferred metal carboxylate, lead octoate, contains about 42% lead by weight.

The metal carboxylates are well known compounds, the preparations for which are well known to the art; the compounds are readily available from many sources.

Preferably, sufficient metal carboxylate is dissolved in the liquid and thermosetting resin to obtain a proportion of metal of at least about 15 weight percent of the total cured polymer, and preferably at least about 20 weight percent. Generally, final metal loading in the cured polymer of more than about 40, and more usually about 35, weight percent interferes with the preparation of the optically transparent polymer. Preferably, a metal loading of about 28 to 35 weight percent polymer is desired in the final curing. When the metal content exceeds 30% by weight, the ability of the resulting polymer to set begins to decrease, eventually resulting in a non-setting viscous liquid at elevated temperatures. It is desired that a weight content of metal is provided so that the resultant cured polymer, at a thickness of 1 inch, has a metal equivalency of at least about 1 mm of solid metal, more preferably at least about 1.25 mm, and still more preferably, at least about 1.5 mm of solid metal.

The liquid, thermosetting resins into which the metal carboxylate is dispersed are transparent upon curing; to achieve this, the metal carboxylate should have an initial dispersability in the resin at the temperature of mixing. The resin and metal carboxylate may need to be heated to above room temperature so that the carboxylate will fully disperse and a fine suspension, preferably a sub-micron suspension, is obtained. The amount of heating depends upon the particular materials being mixed, and the exact reaction temperature can readily be determined empirically based upon the present disclosure. Preferably, the metal carboxylate does not adversely affect the reactivity of the resin monomers to prevent polymerization and/or crosslinking of the monomers.

When the underlying polymer is to be cured by preferably mixing two or more components, e.g., the epoxy resin and amino, the metal carboxylate is first dispersed into the resin components, e.g., the epoxy resin. To avoid entrapment of air while mixing, this can preferably be done under vacuum.

This invention preferably includes the use of thermosetting resins which can be formulated with the metal carboxylate and which are clear setting. Such resins can be in the form of catalyzed molding compounds, reaction injectable resins, and thermoplastic resins.

Suitable thermosetting resins can be selected from polyepoxides, polyesters, polyurethanes, polyisocyanurates, polyethersulfones, polyimides, and mixtures thereof. Resins which are reaction injectable may be selected from polyepoxies, ethylenically unsaturated polyesters, vinylesters, polyester urethanes, vinylisocyanurates, polyurethanes, and blends thereof. Other polymerizable resins include acrylics, styrenes, and tetrafluoroethylene resins. Silicone rubbers such as polydimethyl siloxane may also be useful.

The resin is preferably an epoxy such as a bisphenol A/epichlorohydrin resin, cycloaliphatic epoxy, novalic based epoxy, epoxy varnishes made with esters of epoxy resins, epoxy-aminoplastic resins, allylic resins, polyester, polyurethanes and silicones. More preferably the monomer is selected from the group of epoxy systems, allylic resins, and polyesters. Even more preferably it is an epoxy system, such as the epichlorohydrin-bisphenol A epoxies.

As indicated above, epoxy systems are most preferable. There are numerous commercially available epoxy systems available. In choosing a system one looks at a variety of criteria including that (a) upon cure the resultant crosslinked polyepoxy is transparent, (b) it has a long pot life, (c) it has clarity, (d) it has low color, (e) it has good strength, (f) it is scratch resistance and (g) it has low viscosity. Epoxy systems are well known in the art and are available commercially. For example a summary on epoxy systems is available in Kirk-Othmer, *Encyclopedia of Chemical Technology*, vol. 9, pgs 267–290 (1980) the contents of which are incorporated herein by reference. Epoxy systems are available from a wide range of manufacturers including Shell Chemical Company, Epoxy Technology Corporation, Emerson & Cumming Inc., Ren Plastics, Marblett Corp., Dexter Corp., R.H. Carlson, Inc., Tra-Con Inc., IsochemResin Co., General Mills, Inc., Ferro Chemical Company, Ciba-Geigy Co., etc.

The first component of the epoxy system is an epoxy resin. Non-limiting examples of the epoxy resin, which are known in the art, include, for example, epichlorohydrin/bisphenol A type, epichlorohydrin/bisphenol F type, glycidyl ether of tetrabromobisphenol A type, novolak type epoxy resins, hydrogenated biphenol A type, glycidyl p-oxybenzoate ether ester type, glycidyl ether of bisphenol A-propylene oxide adduct type, urethane modified epoxy resins, alicyclic epoxy resins, m-aminophenol type, diaminodiphenylmethane type, glycidyl ether of polyhydric alcohol (e.g., N,N-diglycidylaniline, N,N-diglycidyl-o-toluidine, triglycidylisocyanurate, polyalkyleneglycol diglycidyl ether and glycerin), hydantoin type, epoxidized unsaturated polymers such as petroleum resin, etc.

The second component includes a curing agent. Non-limiting examples of the curing agent include aliphatic and aromatic amines (e.g., 2,4,6-tris (dimethylaminomethyl) phenol, triethylenetetramine tetramethylenepentamine, diethylaminopropylamine, N-aminoethylpiperazine, diethylaminetriamine, ethylene oxide-amine, methylene dianiline, M-xylylenediamine, M-phenylenediamine), amidoamines, polyamides, tert-amine salts, imidazoles, dicyanoamides, complex compounds of boron trifluoride, anhydrides (e.g., phthalic anhydride, methyl tetrahydrophthalic anhydride, dodecenylsuccinic anhydride, hexahydrophthalic anhydride, chlorendic anhydride, tetrahydrophthalic anhydride, and trimellitic anhydride) alcohols (diols, phenols, etc.), carboxylic acids and mercaptans. Generally, the addition of the metal carboxylates of this invention should not greatly change the proportion of amine curing agent needed at least to cure the expoy resin. Typically, the curing agent is added in an amount of from about 25 to 100 parts be weight per 100 parts of the resin, more preferably, about 30 parts by weight of the curing agent are used relative to 100 parts of the epoxy resin.

Epichlorohydrin bisphenol A-derived systems are typically cured with anhydrides, aliphatic amines or polyamides, depending upon the desired end product. Aliphatic amines are preferable. Cresol novolac epoxy resins are multi functional solid polymers characterized by low ionic and hydrolyzable chlorine impurities. Phenol novolac epoxy resins have a multi epoxy functionality that produces a more tightly cross-linked cured system having improved elevated temperature performance and chemical resistance than does the bisphenol A based resins. Curing agents for this compound include aromatic amines, catalytic curing agents, phenolics and some anhydrides.

For example, representative polyepoxides are reaction products of diglycidyl ethers of bisphenol A or cresol novolacs with various diols, polyols, halogenated polyols, and the like, in the presence of a catalyst such as a boron trifluoride amine complex. Representative, commercially available components include: "Kardura" E available from Shell Chemical Company which is a glycidyl ester produced by reacting epichlorohydrin and a mixture of saturated, highly branched mainly tertiary monocarboxylic acids having $C_9$, $C_{10}$ and $C_{11}$ chain lengths ("Versatic" acid): "Genepoxy M205 which is a modified diglycidly ether of bisphenol A, available from General Mills, Inc.; "Epon" 812, which is a diglycidyl ether of glycerol, available from Shell Chemical Company; "Epon" 826 which is a substantially pure diglycidyl ether of bisphenol A, also available from Shell Chemical Company; and "Epon" 828 which is a slightly resinified form of "Epon" 826, available from Shell Chemical Company. "EpiCure" 3274 is an aliphatic amine also available from Shell Chemical Company. "EB 020 A" is an epichlorohydrin bisphenol epoxy which represents a blend of several epoxies of different molecular weights and structures available from Ferro Chemical Company. "EB 020 B" is a polyoxypropylene amine also available from Ferro which is a second part of the system. Emerson & Cumming Inc. make a number of epichlorohydrin bisphenol systems including "Stycast A" (the epoxy) and "Stycast 1268" and "Stycast 12669 A". A resin derived from epichlorohydrin and cresol novolac precursors "ECN-9860" is available from Ciba-Geigy Co. Other components that are commercially available include "DC-84-66" from Ren Plastics, "Maraglas 658", "Maraglass 659" and "Maraglass 655" all available from Marblett Corp., "TC-6175," "TC-9-6176" available from the Hysol Division of Dexter Corp., "Cure-290" from R.H. Carlson Inc., "Tra-Cast 3012" from Tra-Con, Inc., and "Isochem Trasflex Gel" available from Isochem Resin Company. These can be used and blended according to manufacturer directions. In general, a first, epoxy-containing resin component is mixed with a second, curing-agent-containing compound to form a hardened, cross-linked material. The metal carboxylate can be added to the first component, and then the epoxy/carboxylate composition is cured. Typically the metal carboxylate is in the form of a paste, and any impurities in it can be removed by appropriate filtration prior to its use.

Polyesters are primarily polyesterification products of unsaturated dicarboxylic acids and polyhydric alcohols having 2–26 carbon atoms and at least two hydroxyl groups; examples of generally available polyols are ethylene glycol, diethylene glycol, propylene glycol, dipropylene glycol, glycerol, pentaerythitol, sorbitol, mannitol, sorbitan, erythitol, bisphenol A and most preferably, alkoxylated derivatives of 2, 2-di(4-hydroxyphenyl) propane having a range of 2–20 moles of ethylene oxide or propylene oxide per mole. The dicarboxylic acid can be an unsaturated dicarboxylic acid such as fumaric and maleic, an aromatic acid, such as phthalic, terephthalic, isophthalic or an aliphatic dicarboxylic acid, such as succinic, adipic, suberic, azelaic, sebacic, diethyl succinate; and halogenated derivatives of these acids, such as tetrachloro-o-phthalic acid. Polyester resins having a softening point in the range of 75°–120° C. are preferable.

Polyisocyanuric resins are usually monomer solutions of isocyanurate based on toluene diisocyanate and hydroxypropyl methacrylate, which are soluble in at least one of the following free radical-polymerizable, ethylenically unsaturated monomers, such as divinyl benzene, styrene, methylacrylate, methyl methacrylate, tetramethylene glycol diacrylate, trimethylol propane triacrylate, pentaerythritol triacrylate, neopentaglycol diacrylate, 1,3-butylene glycol diacrylate, 2,3-dibromo propylacrylate, 2,3-dibromo propylmethacrylate, cyclohexyl acrylate, cyclohexyl methacrylate, acrylic acid, methacrylic acid, hydroxyethyl acrylate, hydroxyethyl methacrylate, hydroxypropyl acrylate, hydroxypropyl methacrylate, chlorostyrene, acrylonitrile, vanillylidene chloride, vinyl acetate, vinyl stearate, vinyl toluene, hexane diol diacrylate, hexane diol dimethacrylate and mixtures thereof.

Reaction injectable molding processable polymers can be used as resins. For example, unsaturated polyesters, flame retardant unsaturated polyesters and polyurethanes are useful matrix material. Vinylisocyanurate offers high temperature properties, corrosion resistance and dimensional stability. Vinylmaleate urethanes, flame retardant and corrosion resistant polyester resins (Atlac® Resins) can also be used. In addition, the Derakane® Vinylesters by Dow Chemicals can be employed. RIM processable epoxies, and nylons are also included.

Polyimide prepolymers which are reaction products of active methylene compound with bismaleimides or diamines with maleic anhydride are useful per se or in combination with polysulfones or polyethersulfones. Suitable aromatic polyethersulfone resins include linear polymers containing three kinds of unit bonds, consisting of an arylene bond, an ether bond and a sulfone bond. Such polyethersulfone resins are available under the trademark VICTREX®, from Imperial Chemical Industries. Typically, one prefers a lower weight polymer to maintain a low viscosity.

The polymerization mixture can contain other additives useful for processing of this invention as desired for achieving useful properties in the resultant product. For example, viscosity diluents and depressants, ultraviolet ray adsorbents, dyes, and polyfunctional monomers, unless the purpose of the present invention is hindered by the additives.

Also, the polymerization mixture may be polymerized in the presence of a filler of, for example, glass fibers, uniformly distributed in the mixture or a metallic net embedded in the mixture, in order to produce a plastic material reinforced with the filler or the metallic net, which remain optically transparent.

The polymerizable, or curable, resin and metal carboxylate are blended under conditions to mnimize entrapment of gas within the liquid blend, for example, under a vacuum, such as in a stirred pressure vessel reactor. Typically, the metal carboxylate and resin are mixed at about 20° to 70° C., more preferably about 30° to 40° C.

The metal carboxylates generally have a paste-like consistency. As mentioned, impurities can be removed by forcing the paste through a filter, preferably having a pore size in the range of about 1 micron to about 20 microns. In addition, to reduce viscosity, the paste is preferably heated from about 30° C. to about 50° C. When one is using a multi-component epoxy system, the resin component of the epoxy system is first mixed with the metal carboxylate, for example, the bisphenol A component with the metal carboxylate. As mentioned above, this is done under vacuum to avoid entrapping air during mixing; air bubbles in the final product reduce optical transparency. Thereafter, the second component is added, and the appropriate curing agent, for example, with an epichlorohydrin- bisphenol A epoxide, an aliphatic amine.

The curing of the resin typically produces a highly exothermic reaction. Thus, it is preferable to maintain as low a temperature as practical before the curing agent is added, while at the same time taking care to avoid solidifying the viscous mixture. The curing reaction typically takes from 2 to 24 hours, more preferably 5 to 12 hours.

Thereafter, before the resultant metal-containing polymer is allowed to set, it is molded into the appropriate shape. For example one can do injection molding or any applicable forming method now known or later developed. The components can be used in forming an optically transparent plate that can be used to shield a medical or dental worker from radiation while at the same time allowing them to see a patient undergoing radiation treatment. It can also be molded into shapes that can be used to protect the worker or the patient from exposure to radiation at specific portions of the body. For example, it can be cast into shapes that can be put into medical aprons which can be used as shields. In such a use the clarity of the resultant polymer is obviously not as important.

The present invention is further illustrated by the following examples. These examples are provided to aid in the understanding of the invention and are not to be construed as limitations thereof.

Lead octoate, which contains 42 weight percent lead, is highly viscous and has the consistency of a paste. The paste was heated to 35° to 44° C. to reduce viscosity, and mixed under vacuum in a stirred pressure vessel with an epoxy resin (EB 020 A from Ferro Chemical Co.) in a proportion by weight of 40.0% lead octoate to 19.8% epoxy resin. This mixing continued for a period of from 10 to about 60 minutes, and was then cooled to a temperature of not higher than about 35° C. before 7.4 weight percent (of the epoxy resin) of EB 020 B was added to the resin/lead octoate blend; the resulting mixture was stirred for from 3 to 5 minutes. When the stirred mixture reached a temperature of 60° C. during the polymerization reaction, the material was pressed into a mold.

To prevent polymerization from proceeding too quickly, the system was cooled, as by circulating a glycol through pipes around the mold chamber; the glycol entered the pipes at 0° C.; care must be taken to avoid excessive cooling, which could solidify the mixture too quickly. Thereafter, the resultant viscous mixture was cast in a closed mold to form a rectangular hexahedral shaped block 4 feet by 4 feet by 1⅝ ins. The block was rigid with acceptable hardness and clarity. The block had a light straw color. Subjecting the block to standard X-ray attenuation tests gave data results that showed this block had radiation shield effectiveness equal to 1.5 mm of pure lead metal, i.e., a lead equivalency of 1.5 nun.

It is evident that those skilled in the art given the benefit of the foregoing disclosure may make numerous modifications thereof, and departures from the specific embodiments described herein without departing from the inventive concepts, and the present invention is to be limited solely to the scope and spirit of the appended claims.

What is claimed is:

1. A method for producing a metal-containing transparent thermoset polymer comprising: uniformly dispersing a metal carboxylate having the formula $M((COO)_bR)_a$, wherein M is a metal atom, R is a saturated or an unsaturated hydrocarbon containing at least three carbon atoms, b is an integer equal to 1 or 2, and a is a number equal to the valence of the metal ion used divided by b, the metal carboxylate having a proportion of metal in an amount of from about 20 to about 60 weight percent, into a clear setting resin system at a temperature in the range of from about 0° to about 100° C. under conditions which prevent air from being entrapped in the mixture, the resin system comprising a curable thermosetting resin and a curing agent, and reacting to cure the resin system for a time sufficient for the components to react and said metal-containing transparent polymer to be formed.

2. The method of claim 1, wherein M is selected from the group consisting of, antimony, barium, bismuth, cadmium, tin cerium, cobalt, copper, iron, lead, molybdenum, tungsten, vanadium, and zirconium.

3. The method of claim 2, wherein M is lead.

4. The method of claim 1, wherein the resin is selected from the group consisting of a polyepoxide, polyester, polyurethane, polyisocyanurate, polyethersulfone, polyimide and mixtures thereof.

5. The method of claim 1, wherein the resin is an epoxy.

6. The method of claim 5, wherein the epoxy is selected from the group consisting of bisphenol A-epichlorohydrin, cycloaliphatic epoxy, novolak epoxy, epoxy ester and epoxy amine-adducts.

7. The method of claim 5, wherein the resin is a bisphenol A-epichlorohydrin resin.

8. The method of claim 5 which is cured by an aliphatic amine.

9. The method of claim 7, which is cured by an aliphatic amine.

10. The metal-containing transparent polymer formed by the process of claim 7.

11. A metal containing transparent polymer formed by the process of claim 1.

12. The method of claim 1, wherein M is a metal atom having an atomic number of at least about 40.

13. The method of claim 1, wherein the proportion of metal in the formed polymer comprises at least 15% by weight of the composition.

14. The method of claim 1, wherein R contains at least about 5 carbon atoms.

15. The method of claim 1, wherein the resin is an epoxy and the curing agent is an amine.

16. A metal-containing optically transparent polymer composition comprising a substantially continuous solid phase thermoset polymer, the polymer comprising an organometallic component dispersed throughout the composition, the proportion of metal comprising at least 15% by weight of the composition; the organometallic component having the formula $(M)((OOC)_bR)_a$, wherein M is a metal atom having an atomic number of at least about 40, R is an organic group selected from aliphatic, cycloaliphatic and aromatic groups containing at least about 3 carbon atoms, b equals the number of carboxyl groups attached to each R group and can be an integer equal to 1 or 2, and a equals the number of organic carboxyl groups $(R(COO)_b)$ attached to each metal (M) atom and is determined by the valence of the metal M, and a is equal to the valence divided by b, and an amine curing agent, and wherein neither the metal nor the R group interferes with the curing of the polymer.

17. A metal-containing transparent polymer of claim 16 wherein the polymer is an epoxy polymer.

* * * * *